UNITED STATES PATENT OFFICE.

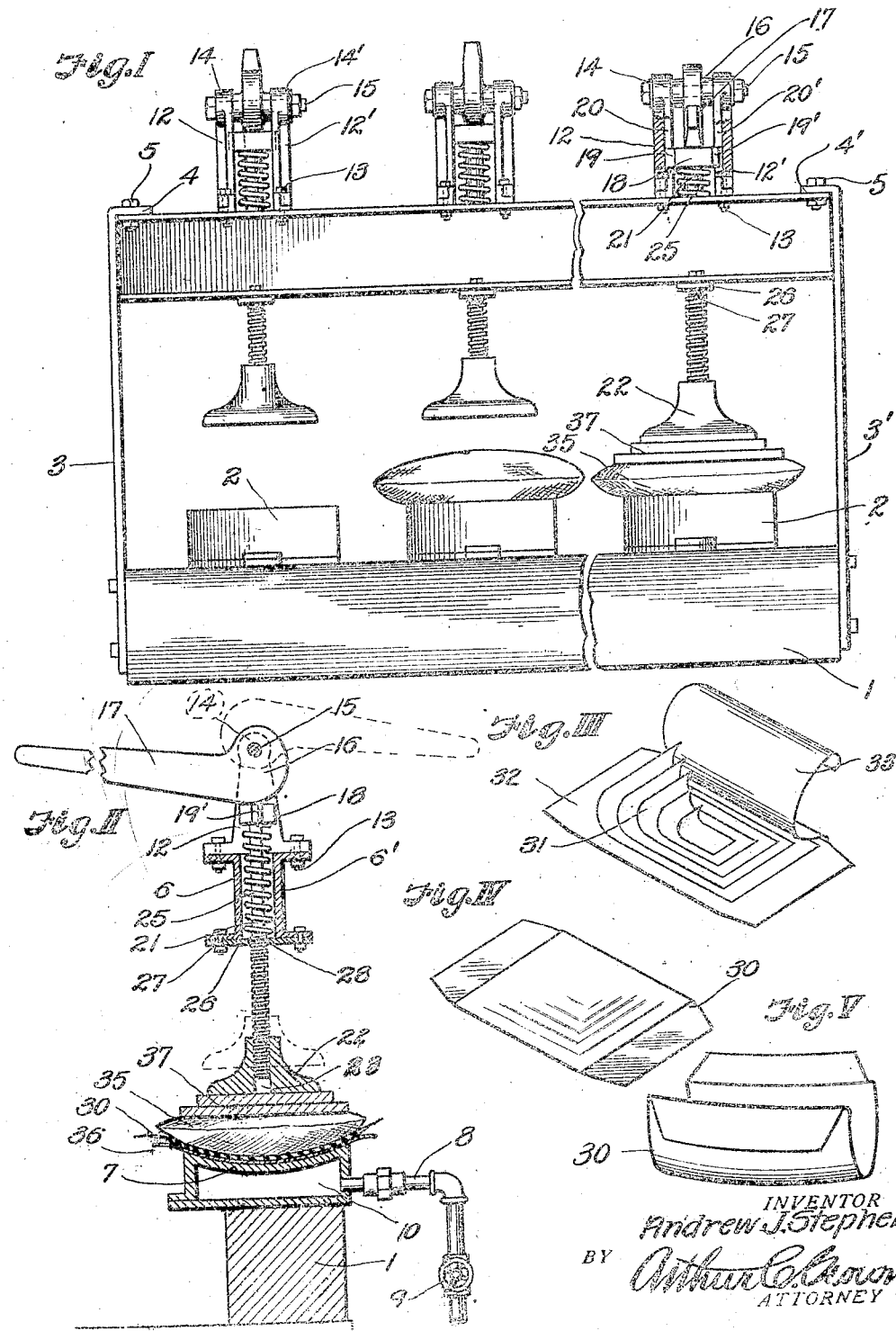

ANDREW J. STEPHENS, OF KANSAS CITY, MISSOURI.

TIRE-PATCH CURING AND SHAPING DEVICE.

1,314,714. Specification of Letters Patent. Patented Sept. 2, 1919.

Application filed April 20, 1918. Serial No. 229,670.

*To all whom it may concern:*

Be it known that I, ANDREW J. STEPHENS, a citizen of the United States, residing at Kansas City, in the county of Jackson and State of Missouri, have invented certain new and useful Improvements in Tire-Patch Curing and Shaping Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to patch curing and shaping devices and more particularly to a device of this character for curing and shaping built-up rubber patches for automobile or similar tires; the principal object of the invention being to provide a device of this character comprising a steam heated shaping mold, for receiving the green patches and a presser member coöperating therewith, together with improved means for effecting proper adjustment of the member and for moving the same to and from operative position.

In accomplishing this object, I have provided improved details of structure, the preferred forms of which are illustrated in the accompanying drawings, wherein:

Figure I is a front elevation of a frame comprising a plurality of shaping devices constructed according to the present invention.

Fig. II is a vertical, transverse, sectional view of one of the units in operation.

Fig. III is a perspective view illustrating the assembling of the parts of a patch.

Fig. IV is a perspective view of a patch before being placed in the shaping device.

Fig. V is a perspective view of a finished patch.

Referring more in detail to the drawings:

1 designates a base beam which may be of such length as to accommodate any desirable number of patch forming molds 2 which are arranged in spaced relation thereon. Fixed at opposite ends of the beam 1 are standards 3—3' which at their upper ends are provided with inturned portions 4—4' for receiving bolts 5 whereby paired beams 6—6' are supported in spaced relation above and parallel to the base beam 1.

As all of the pressing units are identical in construction and operation, only one will be here described in detail with the understanding that the description relates equally to all units.

Each unit comprises a base or shaping mold 2 which is a hollow casting, preferably square in horizontal cross section and provided with a concave upper wall 7; the degree of concavity of which is determined by the curvature which it is desired to give the patch finished therein. At one side a pipe 8, provided with a valve 9 is connected to the mold wherethrough steam or other heating medium may be admitted to the mold chamber 10 to heat the mold to a desirable working temperature.

Mounted transversely on the beams 6—6' centrally above the mold 2 are spaced standards 12—12' which are fixed at their bases to the said beams by bolts 13 and at their upper ends are provided with bearing portions 14—14' for receiving a bolt 15 whereon, between the standards, the cam head 16 at one end of a lever 17 is revolubly mounted.

Mounted between the lever supporting standards 12—12' is a block 18 provided at its opposite ends with ribs 19—19' which are adapted to move vertically in coöperating guide grooves 20—20' in the inner faces of the said standards; the said block being fixed on the upper end of a vertical plunger rod 21 which extends downwardly between the spaced beams 6—6', and which at its lower end is threaded to receive a presser head 22; the latter having a central, vertical threaded channel 23 extending therethrough so that the head may be adjusted longitudinally on the end of the rod.

When the pressure lever 17 is moved to open position (dotted lines Fig. II) the head is lifted to its upper limit by means of a coil spring 25 which is wound about the upper portion of the rod 21 and bears at its upper end against the under side of the block 18 and at its lower end against a supporting plate 26 which extends between the beams 6—6' and is secured thereto at its opposite ends by means of bolts 27; the said plate being provided with an opening 28 wherethrough the rod 21 may move.

The patches 30 (Fig. III) formed and cured in the present device are built up of superimposed layers 31 of uncured or green rubber which are inclosed between lower and top layers 32—33. Before curing, the patches are sticky and easily torn apart but when heated and placed under pressure in the mold are cured and shaped and when removed they constitute a single piece.

In using the device, steam or other heating medium is first admitted into the mold by opening the valve 9 in the pipe 8 so that the mold may be thoroughly heated. The lever 17 is then moved to open position, allowing the spring 25 to raise the rod 21 and lift the head 22 clear of the mold.

An uncured patch 30 is then placed in the concaved upper face 7 of the mold and over this is placed a sand bag 35. A spacer 36 of suitable smooth material being placed between the pad and bag to prevent the patch sticking to the cloth bag. A presser block 37 of wood or other material is then placed on top of the bag and the lever 17 is then moved forwardly (as in Fig. II) to move the rod 21 downwardly against the pressure of the spring 25 to move the head against the presser block and press the bag within the mold and tightly against the patch. Adjustment of the head 22, provided by its threaded mounting on the rod 21 may be made so that proper pressure on the patch may be maintained.

After the patch has been under pressure in the heated mold for a sufficient length of time the lever 17 is thrown back to allow the spring 25 to lift the rod 21 and head 22 so that the presser block and sand bag may be removed and the patch taken from the mold.

It is apparent that with this construction the device may be easily and rapidly operated and by the adjustment provided in the threaded mounting of the head 22 a desirable pressure on the patch may be effected regardless of variations in the thicknesses of sand bags used.

It is also apparent that the spring provided will assist in moving the lever to open position and will yieldingly retain the parts in open position so that placing of the patches in the mold is greatly facilitated.

It will be seen that devices of this character may be made in various sizes to accommodate patches of various sizes and variations in detail construction of the parts could be made without departing from the spirit of the invention.

Having thus described my invention, what I claim as new therein and desire to secure by Letters-Patent, is:—

1. In a device for curing and shaping rubber patches, a hollow mold bed, means for heating the hollow mold bed, a pressure head having longitudinal movement toward and away from the mold bed, means for directing a power thrust axially against the pressure head and means axially of the pressure head for retracting the pressure head away from the bed.

2. In a device for curing and shaping rubber patches, a hollow mold bed, means for heating the hollow mold bed, a pressure head having longitudinal movement toward and away from the mold bed, a retractable spring axially of the pressure head, and means for directing a power thrust axially against the pressure head.

3. In a device for curing and shaping rubber patches, a hollow mold bed, means for heating the hollow mold bed, a vertically adjustable pressure head having longitudinal movement toward and away from the mold bed, and a cam lever in line with the axis of the head for exerting pressure axially against the pressure head.

4. In a device for curing and shaping rubber patches a mold having an interior heating chamber and having a concaved upper face for receiving patches to be cured and shaped therein, a plunger, a presser head adjustably mounted on one end of the plunger movable therewith toward and from the mold and a pivotally mounted lever having a cam head engageable with the opposite end of said plunger to actuate the head to functional position.

5. In a device for curing and shaping rubber patches, a mold having an interior heating chamber and having a concaved upper face for receiving the patches to be cured and shaped therein, a slidably mounted plunger mounted above the mold having a threaded lower end, a presser head threaded onto the lower end of said plunger, adjustable thereon, and movable therewith toward and from the mold, a pivotally mounted lever having a cam head engageable with the opposite end of said plunger to move the presser head downwardly to functional position and means for moving the plunger and head to raised position on release of said lever.

6. In a device of the character described, a base beam, paired supporting beams spaced thereabove, a mold mounted on the base beam having an upper mold face, paired lever supporting standards mounted on the supporting beams a vertical plunger having an upper end guide block slidably mounted between said lever standards, a presser head adjustably mounted on the lower end thereof and movable therewith toward and from said mold and a lever pivotally mounted between said standards having a cam head thereon movable into engagement with said upper end of guide block to actuate the presser head to functional position.

7. In a device of the character described, a base beam, paired supporting beams mounted above the base beam parallel thereto and in slightly spaced relation, a mold mounted on the base beam having an upper mold face, paired lever supporting standards mounted on the supporting beams directly above the mold, and having a guide block slidably mounted therebetween a plunger fixed at its upper end in said blocks, extending vertically toward said mold, a presser head threaded onto the lower end of said plunger and adjustable thereon toward or from the mold, a lever pivotally mounted between the standards having a cam head adapted to engage said guide block to actuate the plunger to move the presser head to functional position, and a spring engaging said block to raise the plunger and head on release of said lever.

8. A device for curing and shaping rubber patches comprising a base beam, paired supporting beams mounted in spaced relation above the base beam parallel thereto and in spaced relation, a mold mounted on the base beam having an interior heating chamber and an upper mold face for receiving the patches to be cured and shaped therein, paired lever supporting standards mounted on the supporting beams directly above the mold, and having a guide block slidably mounted therebetween, a plunger fixed at its upper end in said block, extending vertically toward said mold, a presser head threaded onto the lower end of said plunger and adjustable thereon toward or from the mold, a lever pivotally mounted between the standards having a cam head adapted to engage said guide block to actuate the plunger to move the presser head to functional position, an apertured plate fixed to the lower edges of said supporting beams for slidably containing said plunger and bearing at its opposite ends against said guide block and plate to return said plunger and head to raised position on release of said lever.

In testimony whereof I affix my signature.

ANDREW J. STEPHENS.